United States Patent
Pischl et al.

(10) Patent No.: US 8,582,710 B2
(45) Date of Patent: Nov. 12, 2013

(54) RECOVERY AND SYNCHRONIZATION FOR SPREAD SPECTRUM MODULATED CLOCK

(75) Inventors: Neven Pischl, Santa Clara, CA (US);
Joseph Cordaro, Irvine, CA (US);
Yongbum Kim, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 244 days.

(21) Appl. No.: 13/077,506

(22) Filed: Mar. 31, 2011

(65) Prior Publication Data
US 2012/0250728 A1 Oct. 4, 2012

(51) Int. Cl.
*H04L 7/04* (2006.01)

(52) U.S. Cl.
USPC ........... 375/362; 375/130; 375/140; 375/147; 375/316; 375/148; 375/354; 375/356; 375/371; 375/373; 375/376; 375/374; 375/375

(58) Field of Classification Search
USPC ......... 375/130, 140, 147, 316, 148, 354, 356, 375/362, 371, 373, 376, 374, 375
See application file for complete search history.

(56) References Cited

U.S. PATENT DOCUMENTS

| | | | |
|---|---|---|---|
| 6,278,718 B1* | 8/2001 | Eschholz | 370/503 |
| 7,558,357 B1* | 7/2009 | Greshishchev et al. | 375/371 |
| 7,664,204 B1* | 2/2010 | Wang et al. | 375/326 |
| 2006/0056564 A1* | 3/2006 | Takeuchi | 375/376 |
| 2010/0124253 A1* | 5/2010 | Weiss | 375/130 |

* cited by examiner

*Primary Examiner* — Siu Lee
(74) *Attorney, Agent, or Firm* — Sterne, Kessler, Goldstein & Fox P.L.L.C.

(57) ABSTRACT

Embodiments allow for the use of the SS modulation technique (and thus for significant reduction of EMI due to clock transmission) in scenarios involving tight synchronization requirements between two devices. In particular, embodiments can be used in high-speed communication networks (e.g., high-speed Ethernet) where a clock signal embedded in the data stream at the transmitter and recovered from the data stream at the receiver is the only source for synchronization between the transmitter and the receiver (i.e., no other synchronization channel available). Embodiments are also especially useful in communication systems utilizing echo cancellers.

21 Claims, 8 Drawing Sheets

RECOVERY AND SYNCHRONIZATION FOR SPREAD SPECTRUM MODULATED CLOCK

BACKGROUND

1. Field of the Invention

The present invention relates generally to clock transmission and recovery.

2. Background Art

Embedding a clock signal in a transmitted data stream is a known method for transmitting a clock signal from a transmitter to a receiver in applications requiring clock synchronization between the transmitter and the receiver. One problem associated with this method is the electromagnetic interference (EMI) caused by transmitting the clock signal in the data stream. Specifically, embedding the clock signal into the data stream causes additional EMI components at harmonic frequencies of the clock frequency to be imposed over the broadband EMI spectrum due to the data transmitted.

One technique for reducing EMI due to clock signal transmission uses spread spectrum (SS) modulation to spread EMI components due to the clock over frequency. However, the SS modulation technique causes jitter in the transmitted clock in the time domain. For this reason, the SS modulation technique for reducing EMI cannot be used in systems that require tight clock synchronization between the transmitter and the receiver, such as in high-speed communication networks (and especially networks which use echo cancellation between transceivers), for example.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Embedding a clock signal in a transmitted data stream is a known method for transmitting a clock signal from a transmitter to a receiver in applications requiring clock synchronization between the transmitter and the receiver. One problem associated with this method is the electromagnetic interference (EMI) caused by transmitting the clock signal in the data stream. Specifically, embedding the clock signal into the data stream causes additional EMI components at harmonic frequencies of the clock frequency to be imposed over the broadband EMI spectrum due to the data transmitted.

Figure 1:
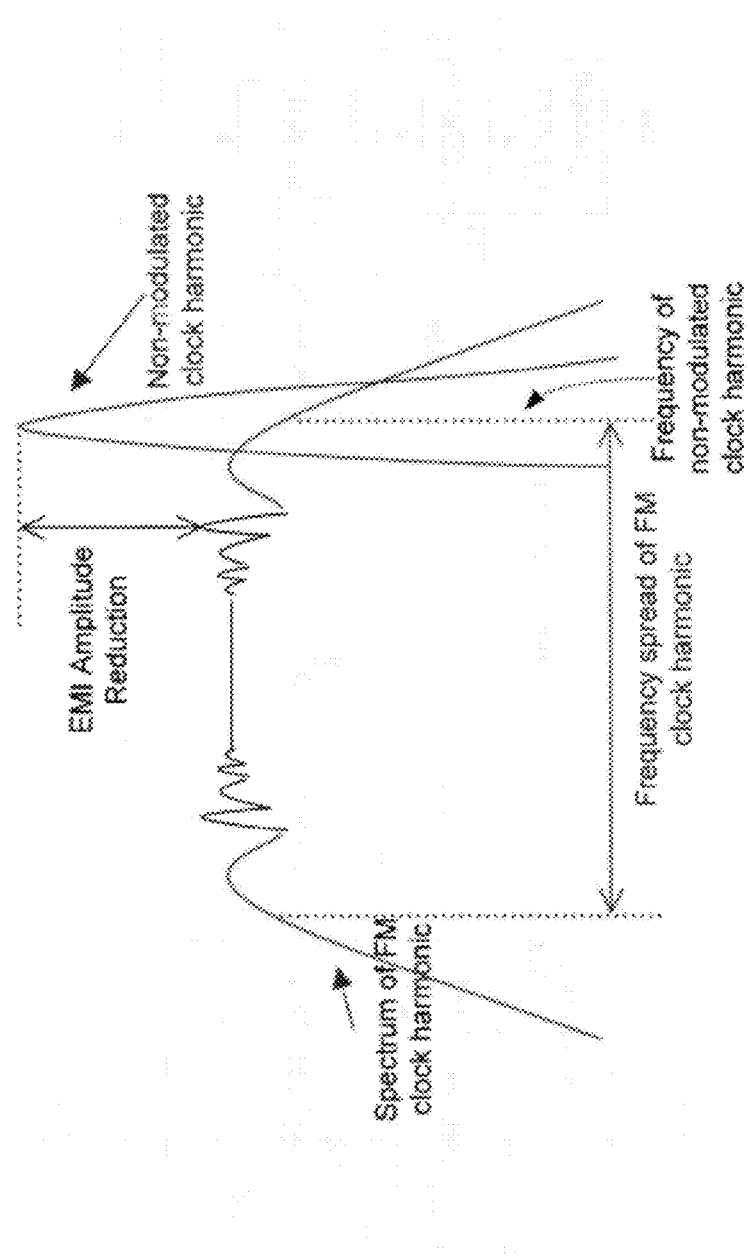
FIG. 1 illustrates the effects of frequency modulation on the frequency spectrum of a clock harmonic.

FIG. 1 illustrates one technique for reducing EMI due to clock signal transmission. The technique uses spread spectrum (SS) modulation by, for example, frequency modulating the fundamental clock frequency of the clock signal. The result in the frequency domain, as illustrated in FIG. 1 with respect to an example clock harmonic, is an amplitude attenuation of EMI spectral components due to the clock signal as well as a spreading of the spectrum of the EMI spectral components over frequency. In the time domain, however, frequency modulating the clock signal results in changes in the period of the clock signal as a function of the modulating frequency, which can be observed as deviations in time of the clock signal timing (edges) or jitter.

As a result, conventionally, the SS modulation technique is only used in situations where the receiver is able to tolerate the amount of jitter caused by the technique or where both the transmitter and receiver receive the same frequency modulated clock signal from the same source, in which case the relative timing of the clock signal edges between the transmitter and the receiver is constant (i.e., there is no jitter at the receiver relative to the transmitter). For example, the SS modulation technique may be used between a microprocessor (transmitter) and its external memory (receiver), where both the microprocessor and the memory are on the same clock domain and receive the same frequency modulated clock.

However, because of the jitter that it produces, the SS modulation technique is not used conventionally between systems that use separate clock domains but which require tight clock synchronization between them. For example, in high speed communication applications, link-up between two devices each operating on a respective clock domain cannot be established if the two clocks are not synchronized to within a very tight timing tolerance. As an example, in gigabit Ethernet (1000BASE-T PCS and PHY), the master and slave clocks must be synchronized to within 100 ppm in order for a link between a master device and a slave device to be established. The master device embeds a clock signal in the data stream transmitted to the slave device. Thus, the embedded clock signal cannot deviate in transmission by more than the maximum 100 ppm tolerance, which generally precludes the use of the SS modulation technique to reduce EMI.

Embodiments of the present invention, as further discussed below, allow for the use of the SS modulation technique (and thus for significant reduction of EMI due to clock transmission) in scenarios involving tight synchronization requirements between two devices. In particular, embodiments can be used in high-speed communication networks (e.g., high-speed Ethernet) where a clock signal embedded in the data stream at the transmitter and recovered from the data stream at the receiver is the only source for synchronization between the transmitter and the receiver (i.e., no other synchronization channel available). Embodiments are also especially useful in communication systems utilizing echo cancellers.

Embodiments will be described below with reference to an Ethernet communication link. However, as would be understood by a person of skill in the art based on the teachings herein, embodiments are not limited to the use in communication applications but extend to any application involving clock transmission and recovery between two devices (e.g., microprocessor and memory), where tight clock synchronization is required. Further, embodiments are not limited to scenarios involving the SS modulation technique by frequency modulation of the clock signal, but extend to scenarios using other modulation techniques of the clock that produce the same spreading effect of the EMI due to the clock.

Figure 2:
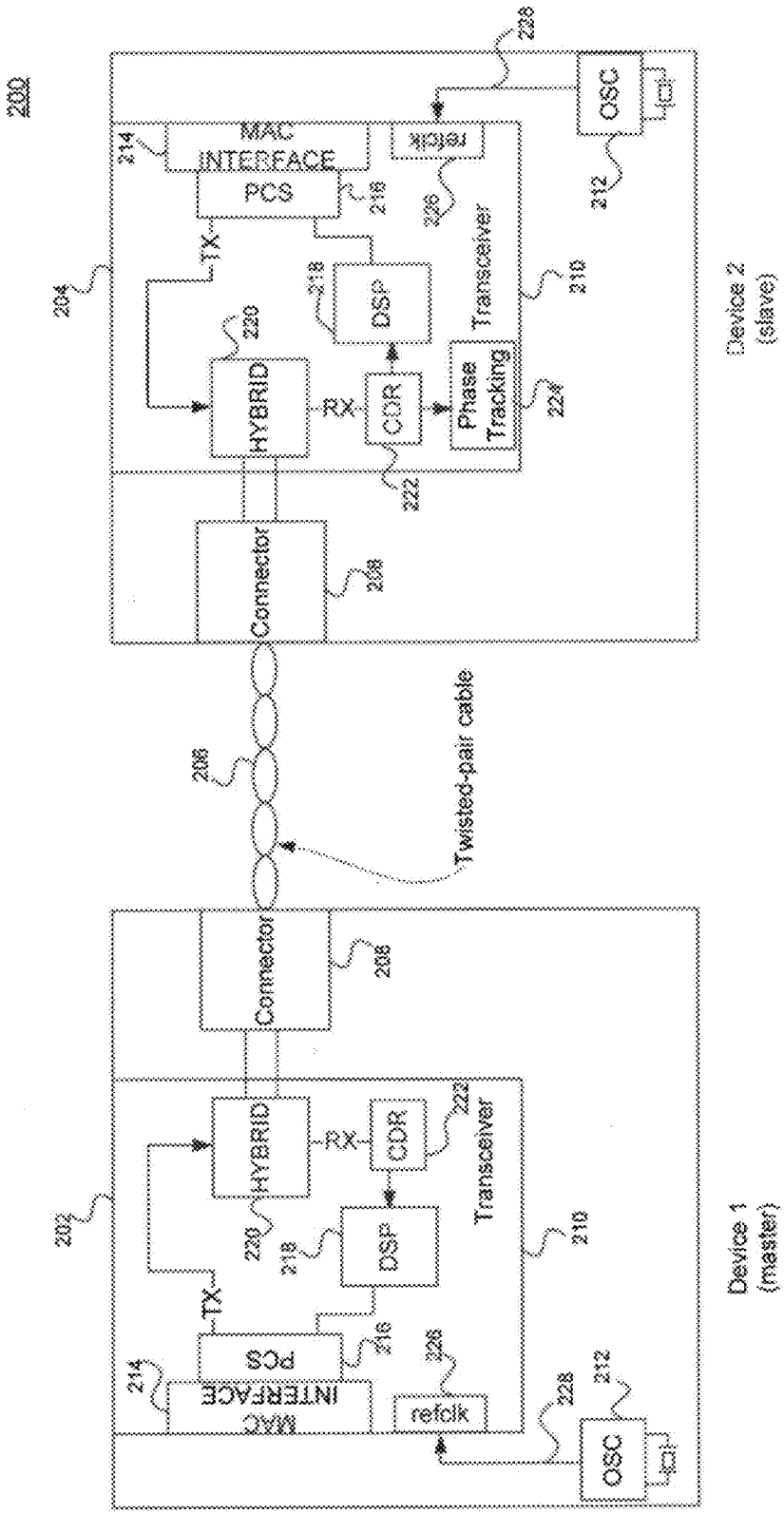
FIG. 2 illustrates an example communication arrangement.

FIG. 2 illustrates an example Ethernet communication arrangement 200. As shown in FIG. 2, example arrangement 200 includes a master device 202 and a slave device 204 connected via a twisted-pair cable 206. Master device 202 and slave device 204 each includes, among other components, an Ethernet connector port 208, a transceiver module 210, and a local oscillator 212.

Transceiver module 210 includes a MAC (medium access control) interface 214, a PCS (physical coding sublayer) module 216, a DSP (digital signal processor) 218, a hybrid coupler 220 for separating the transmit and receive paths of the transceiver, and a CDR (clock and data recovery) module 222 for recovering the data and clock from the receive path. The timing recovery method used by CDR module 22 may be decision directed using the Mueller-Muller algorithm, for example, or some other non-interpolative method. Additionally, transceiver module 210 may include a phase tracking module 224 (which is shown in FIG. 2 in the slave device transceiver only, but may also be available in the master device transceiver), and a reference clock module 226 for receiving a local clock 228 from local oscillator 212.

In operation, master device 202 and slave device 204 each has a local free-running clock of a certain tolerance (ppm requirement) provided by its respective local oscillator 212. In addition, the master clock is used as a reference clock for both sides of the link. Accordingly, master device 202 embeds its local clock signal in the data stream transmitted to slave device 204. Slave device 204 recovers the embedded clock signal from the received data stream using CDR module 222. However, because the communications channel provided by twisted-pair cable 206 can be very noisy, the recovered clock is not directly used by slave device 204. Instead, local clock 228 at slave device 204 is phase aligned using phase tracking module 224 to the best estimate of the recovered clock. In gigabit Ethernet (which is bidirectional), slave device 204 uses its phase-aligned local clock 228 in transmitting data to master device 202. Master device 202 recovers a clock from the data transmitted by slave device 204. The recovered clock at master device 202 is substantially frequency-locked to the local clock at master device 202.

Ideally, it is desired that the phase shift between local reference clock 228 and the recovered clock at slave device 202 be constant. In practice, the phase shift must be only slowly varying within a tight tolerance in order for slave device 202 to be able to perform precise clock recovery. As a result, the use of the SS modulation technique to reduce EMI (with the clock jitter that it produces) is precluded in conventional high-speed communication networks, such as gigabit Ethernet, for example.

Embodiments of the present invention, as further described below, recognize that if both the indication of whether the local clock at slave device 204 is leading/lagging the local clock at master device 202, and the relative phase shift versus time of the transmitted master clock (embedded in the data transmitted to slave device 204) are available at slave device 204, then slave device 204 can use this information to phase align its local clock with the local clock of master device 202 even if the phase of the transmitted master clock exhibits large phase shifts during transmission (e.g., if the master clock is frequency modulated). As such, the SS modulation technique can be used and its benefits of EMI reduction can be realized in high-speed communication networks, such as gigabit Ethernet, for example.

Figure 3:
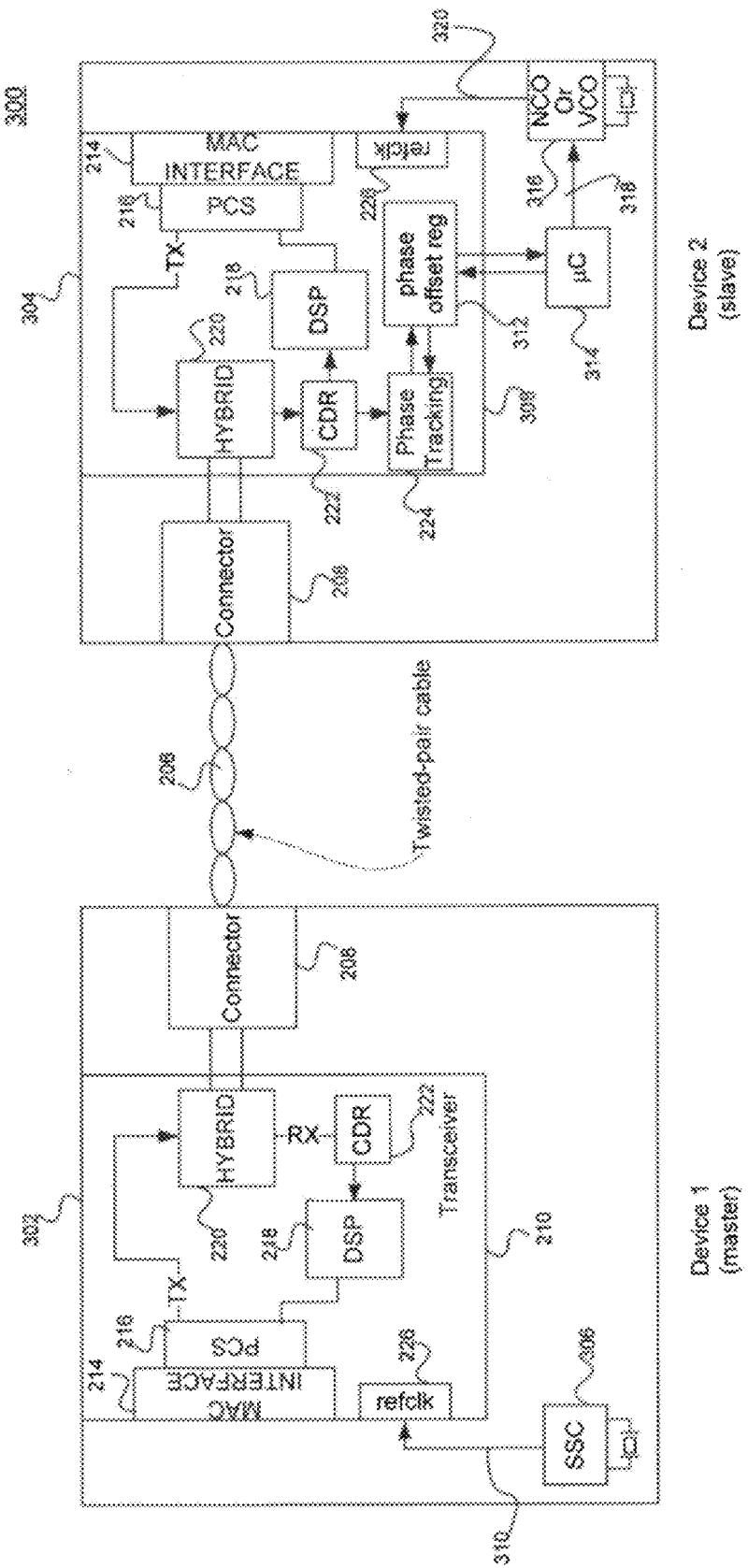
FIG. 3 illustrates an example communication arrangement implementing embodiments of the present invention.

FIG. 3 illustrates an example communication arrangement 300 implementing embodiments of the present invention. Example arrangement 300 is similar to example arrangement 200 described in FIG. 2 above. However, example arrangement 300 is configured to implement the SS modulation technique. As such, at master device 302, a spread spectrum controller (SSC) module 306 provides a spread spectrum modulated (e.g., frequency modulated) local clock 310 to transceiver module 210. At slave device 304, transceiver module 308 includes a phase offset register 312 (in addition to other components described above with reference to FIG. 2). Phase offset register 312 communicates with phase tracking module 224. In addition, slave device 304 includes a microcontroller 314 (which may be integrated in transceiver 308) and a Numerically Controlled Oscillator (NCO) or Voltage Controlled Oscillator (VCO) 316. The choice between a NCO and a VCO depends on the amount of phase variations expected; typically, a NCO can have a larger phase excursion than a VCO, allowing larger depth of modulation or percentage of spread of the clock.

In operation, master device 302 and slave device 304 begin by performing a negotiation process (further described below) to determine the support of the SS modulation technique (e.g., FM modulated clock) at both ends of the communication link as well as (optionally) the propagation delay of the cable. At the end of successful negotiation, master device 302 begins to transmit a SS modulated clock in the data stream transmitted to slave device 304.

At slave device 304, CDR module 222 recovers the SS modulated clock from the received data stream and determines a phase offset between the recovered clock and its local clock 320. The phase offset value is stored in phase offset register 312. In an embodiment, phase offset register 312 has a sign bit which is used to indicate if the phase offset is positive or negative (i.e., if the local clock is leading or lagging the recovered clock).

Figure 5:
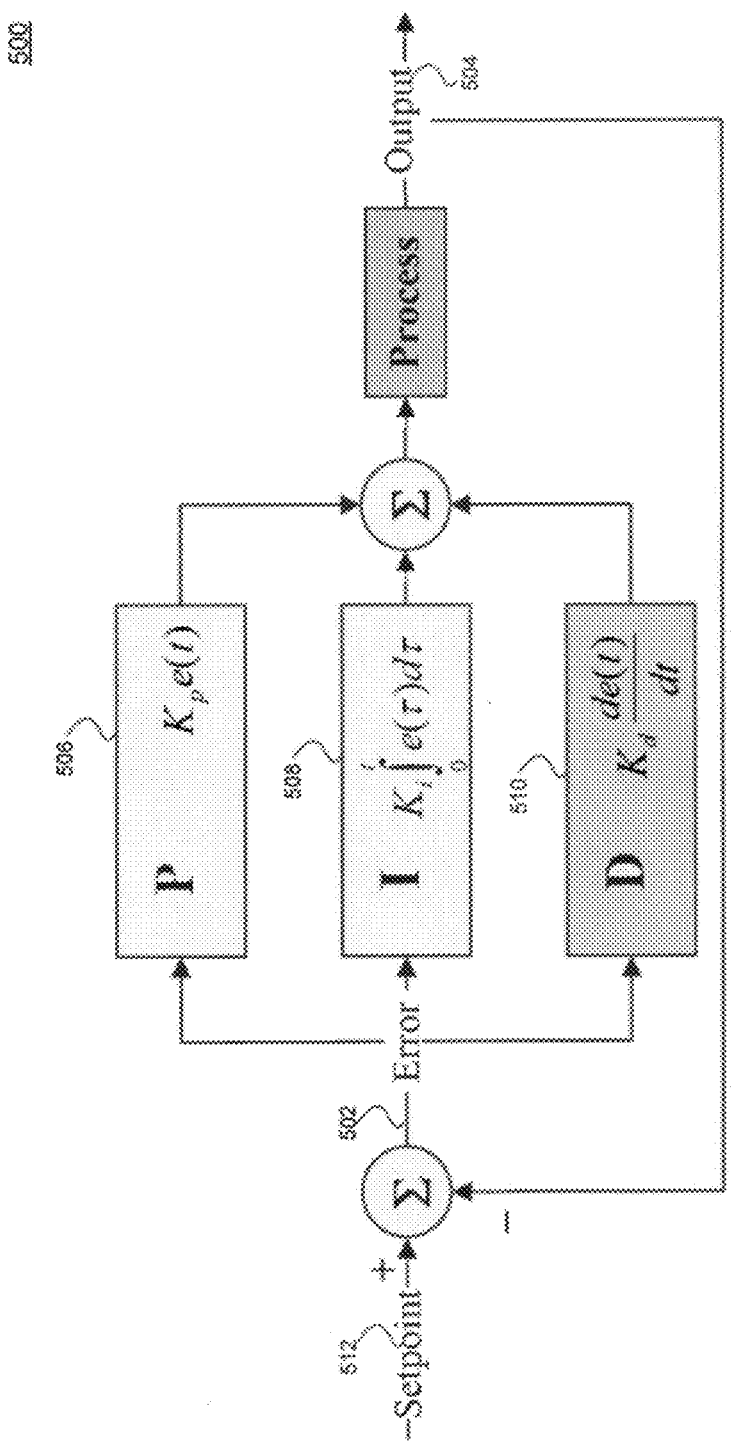
FIG. 5 illustrates a proportional-integral-derivative (PID) controller.

Microcontroller 314 retrieves the phase offset value from phase offset register 312. In an embodiment, microcontroller 314 implements a discrete version of a proportional-integral-derivative (PID) controller algorithm. A block diagram of a generic PID controller 500 is shown in FIG. 5. As shown in FIG. 5, the PID controller operates to eliminate an error signal 502 by generating an output signal 504 based on (e.g., weighted sum of) proportional 506, integral 508, and derivative 510 functions of error signal 502, and subtracting the generated output signal 504 from a setpoint signal 512.

Microcontroller 314 uses the phase offset value as the error signal (corresponds to error signal 502 in PID controller 500) in its PID controller algorithm and generates an output signal 318 (corresponds to output signal 504 in PID controller 500) based on the phase offset value. Output signal 318 provides a new setpoint value for NCO/VCO 316. The new setpoint value is equal to a previous setpoint value plus/minus a phase adjustment value. Upon receiving a new setpoint value, NCO/VCO 316 ramps local clock 320 to a new frequency based on the new setpoint value. The new frequency of local clock 320 reduces the phase offset between the recovered clock and local clock 320.

In an embodiment, microcontroller 314 samples periodically phase offset register 312 to retrieve a new phase offset value. The process described above is repeated with the new phase offset value so that local clock 320 tracks the recovered clock as the phase of the recovered clock varies over time.

Figure 6:
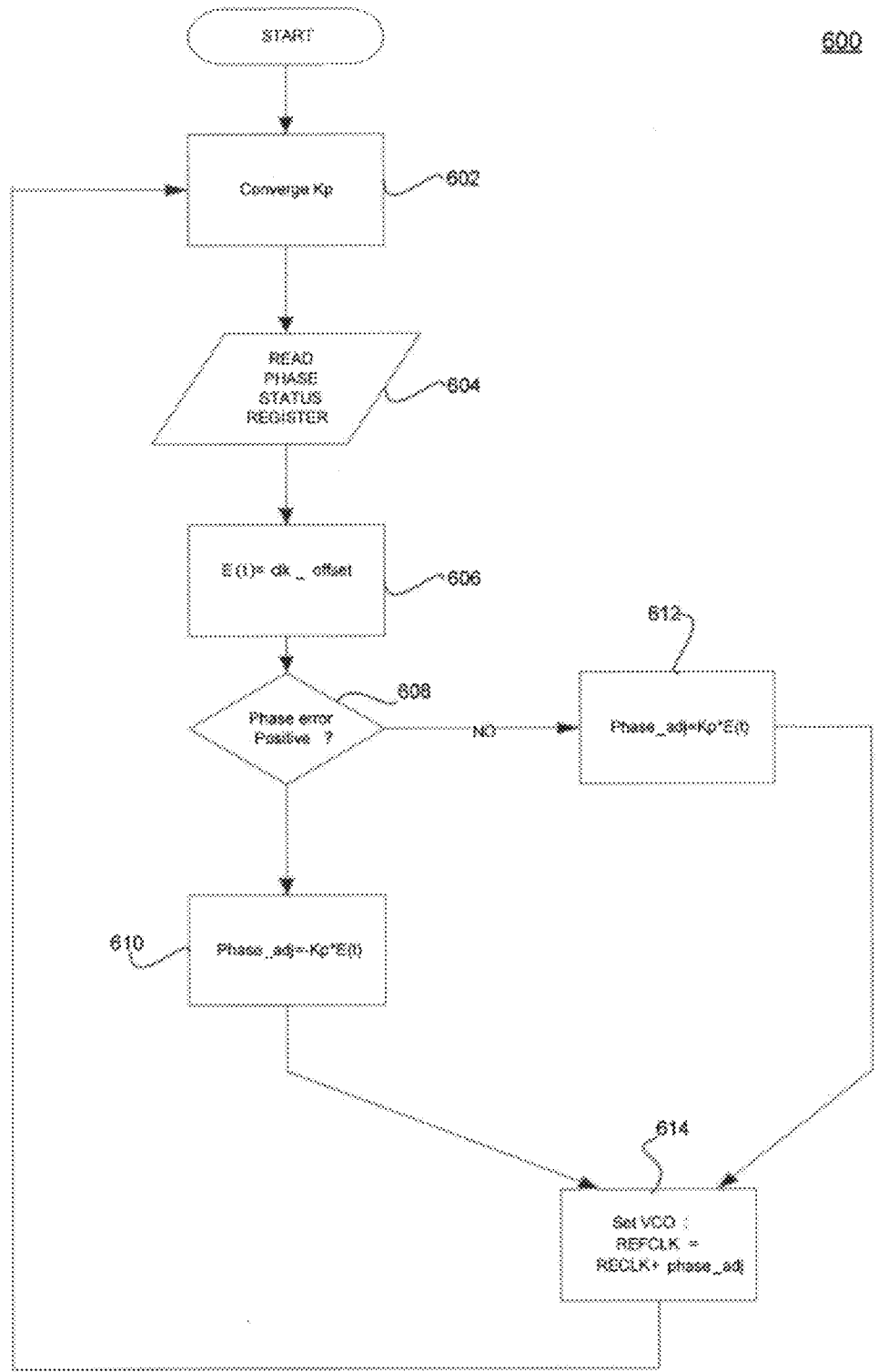
FIG. 6 illustrates an example process according to an embodiment of the present invention.

FIG. 6 illustrates an example process 600 implemented by microcontroller 314. Example process 600 implements a PID controller algorithm with the integral control term $K_i$ and the derivative control term $K_d$ set to zero (see FIG. 5). Thus, example process 600 implements only a proportional function of the error. As would be understood by a person of skill in the art based on the teaching herein, embodiments of the present invention are not limited to example process 600, but extend to any implementation of a PID controller algorithm which can be derived from the generic PID controller algorithm of FIG. 5.

Process 600 begins in step 602, which includes converging the proportional control term $K_p$ of the PID controller algorithm (see FIG. 5). Step 604 includes reading a phase offset value. In an embodiment, step 606 includes microcontroller 314 reading the phase offset value from phase offset register 312. In step 606, the error signal E(t) of the PID controller algorithm is set to the read phase offset value. In step 608, the sign of the error signal or the phase offset value is determined. If the error signal is positive, a phase adjustment value "Phase_adj" is set to $-K_p.E(t)$ in step 610. Otherwise, if the error signal is negative, the phase adjustment value "Phase_adj" is set to $+K_p.E(t)$ in step 612. Finally, in step 614, the output of the PID controller algorithm is adjusted by the phase adjustment value. Because the output of the PID controller algorithm represents the setpoint of the NCO/VCO 316, the local clock 320 output by the NCO/VCO 316 is also adjusted by the phase adjustment value in the same manner.

As described above, in an embodiment, microcontroller 314 samples periodically phase offset register 312 to retrieve a new phase offset value and perform a PID controller process, such as example process 600. The sampling frequency of phase offset register 312, required to precisely track the recovered clock, depends on the rate of change of the phase offset between the local clock and the recovered clock. As a result, when the SS modulation technique is used, a large sampling frequency of phase offset register 312 is needed in order to precisely track the recovered clock, placing a heavy load on microcontroller 314.

In an embodiment, the sampling burden placed on microcontroller 314 can be reduced by the use of a predictive algorithm that predicts changes in the phase of the recovered clock in between sampling cycles of phase offset register 312 by microcontroller 314. The predictive algorithm can make use, for example, of known characteristics of the modulation (e.g., frequency modulation) performed on the master clock as well as the cable length (propagation delay). In an embodiment, the modulation characteristics are pre-set and known at both sides of the communication link.

Figure 4:
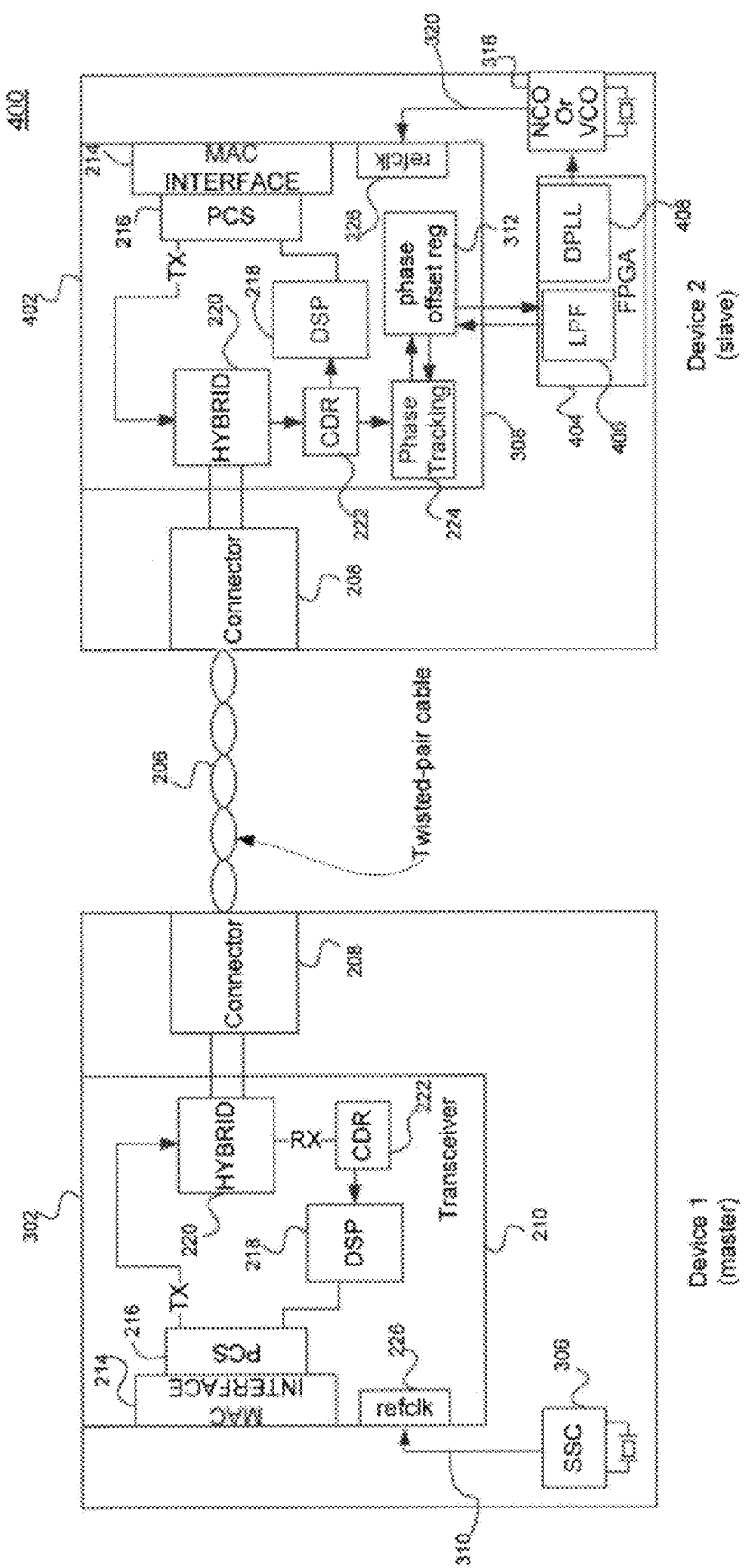
FIG. 4 illustrates another example communication arrangement implementing embodiments of the present invention.

FIG. 4 illustrates an example communication arrangement 400 implementing embodiments of the present invention. Particularly, in example arrangement 400, slave device 402 implements a predictive algorithm that predicts changes in the phase of the recovered clock, in between sampling cycles of phase offset register 312 by microcontroller 314 (not shown in FIG. 4).

As shown in FIG. 4, slave device 402 includes (in addition to other components described above with reference to FIGS. 2 and 3) a FPGA (Field Programmable Gate Array) module 404. FPGA module 404 implements a digital PLL (Phase Locked Loop) 408. Optionally, FPGA module 404 also implements a low pass filter (LPF) 406. FPGA module 404 may be implemented within transceiver module 308 or in a separate module from transceiver module 308, as shown in FIG. 4.

In an embodiment, digital PLL 408 is used to predict a change in the phase of the recovered clock based on known characteristics of the modulation (e.g., frequency modulation) performed on the recovered clock. A control circuit (not shown in FIG. 4) uses the predicted change in the phase of the recovered clock to calculate a predicted phase offset value, and then uses the predicted phase offset value to control NCO/VCO 316 in the same manner as microcontroller 314.

Periodically, the predicted phase offset value calculated by the control circuit is checked and corrected by microcontroller 314. In an embodiment, microcontroller 314 performs a periodic read of phase offset register 312 and corrects the predicted phase offset value, as needed, according to the actual value of the phase offset read from phase offset register 312. In an embodiment, this is done by adjusting or interpolating the DPLL accordingly.

In an embodiment, the tracking accuracy of the system can be improved by filtering out high-frequency noise components (i.e., jitter due to channel characteristics and interference) from the recovered clock phase information signal. In FIG. 4, this is implemented using a LPF 406 before DPLL 408. LPF 406 is designed to pass the bandwidth of the clock modulating signal (used to modulate the transmitted clock) and to reject other frequencies. It is noted that because the frequency of the clock modulating signal is typically much lower than the frequency of the clock itself, time variations of the recovered clock phase are relatively slow and thus low pass filtering of the recovered clock phase signal does not affect the recovered clock phase information.

In another embodiment, spectral lines in the waveform transmitted by the master device can be further reduced by using the transmit scrambler to modulate not only the data but also the transmitted clock signal. Typically, a scrambler is a shift register that outputs a pseudo-random number given an input. Scramblers are traditionally used to modify the data stream before transmission to ensure that a repetitive data pattern is not transmitted onto the twisted pair cable. By using the scrambler to modulate the clock signal, a direct sequence spread spectrum (DSSS) type spread spectrum waveform is produced. In an embodiment, a self-synchronizing scrambler (i.e., one that does not require initialization to recover unscrambled data from scrambled data) is used to reduce initialization complexity. In an embodiment, the master device uses the data scrambler or a scrambler derived from the data scrambler to generate clock 310. In an embodiment, for gigabit Ethernet, the transfer function for the data scrambler at the master device is $G_M(x)=1+x^{13}+x^{33}$, and at the slave device is $G_M(x)=1+x^{22}+x^{33}$, for example. At the slave device, a shift register aligned with the shift register at the master device (i.e., the transmit scrambler) is used to modulate the local clock (e.g., clock 320) to match the incoming signal.

As would be understood by a person of skill in the art based on the teachings herein, embodiments are not limited by the example implementations provided herein. For example, according to embodiments, one or more of the components described above as being external to the transceiver module can be integrated into the transceiver module. For example, at the master device side, the SSC module 306 can be integrated into transceiver module 210. As such, a non-spread clock is input to transceiver module 210 instead of spread spectrum modulated clock 310. Similarly, at the slave device side, any of the circuitry required for clock recovery, phase detection, phase tracking, and synchronization can be implemented into the die of the transceiver. In addition, any of the modules or circuits described above can be implemented using digital, analog, or mixed digital and analog components.

As described above, embodiments enable the use of the SS modulation technique to reduce EMI in high-speed communication networks, such as gigabit Ethernet, for example. To enable interoperability and backwards compatibility with existing devices, embodiments may be provided as optional features to be enabled on demand. For example, embodiments may be enabled at either side of a communication arrangement when both communicating devices (e.g., master and slave in an Ethernet link) support the SS modulation technique. Alternatively, embodiments are disabled when only non-modulated clock transmission can be used.

According to embodiments, to determine whether the SS modulation technique can be supported, a negotiation process is performed between the two communicating devices. If the negotiation process is successful, the master device begins to transmit a SS modulated clock in the data stream transmitted to the slave device. Initially, however, for a short period during linkup, the two communicating devices may operate without clock modulation, until the link is established and meets a certain quality threshold. This allows for a simplified timing recovery circuit at the slave device which does not require a very wide bandwidth to lock onto the master device.

In certain applications, the cable propagation delay must be taken into account. According to embodiments, the cable propagation delay is determined using time domain reflectometry (TDR) or other equivalents methods, or if the cable length is fixed in an installation such as an automobile, airplane, or bus, the cable length can be programmed in memory (e.g., via EEPROM). In any case, the propagation delay of the cable according to embodiments is made available to the algorithm so that the step size and filter parameters can be set.

Figure 7:
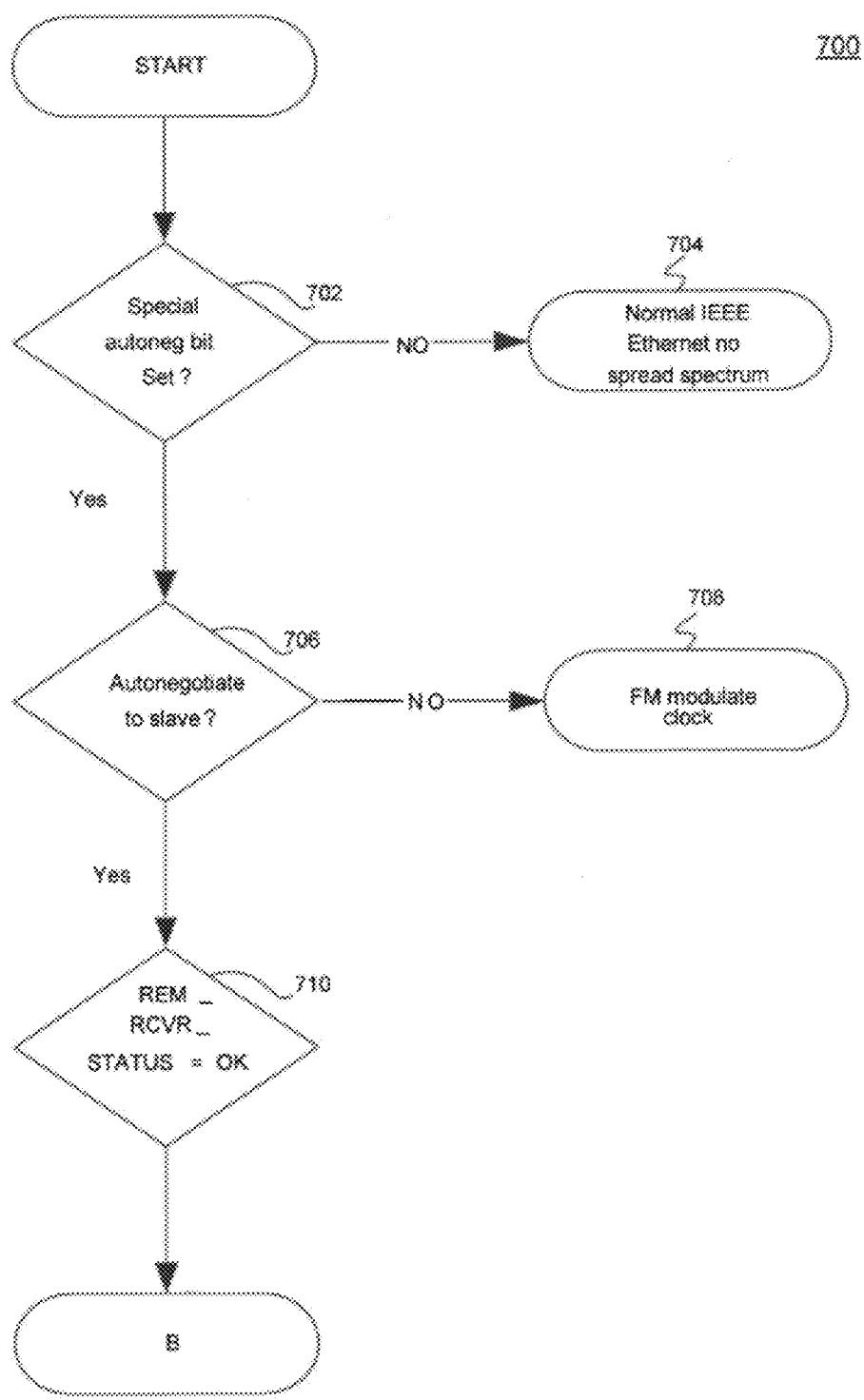
FIG. 7 illustrates an example process according to an embodiment of the present invention.

For the purpose of illustration only, an example negotiation process 700 is provided in FIG. 7. Example process 700 assumes an Ethernet setup. However, embodiments are not limited by example process 700, and other negotiation processes can be used depending on the particular application of embodiments.

Process 700 is performed at the master device. As shown in FIG. 7, process 700 begins in step 702, which includes determining whether a special auto-negotiation bit is set. The auto-negotiation bit determines whether negotiation for the purpose of using the SS modulation technique must be performed. If the auto-negotiation bit is not set, process 700 proceeds to step 704, which indicates that normal IEEE Ethernet without the SS modulation technique will be used. Alternatively, if the auto-negotiation bit is set, process 700 proceeds to step 706. Step 706 includes determining whether auto-negotiation with the slave device is required. If auto-negotiation is not required (e.g., the link has already been established), process 700 proceeds to step 708 in which clock modulation (e.g., FM modulation) begins. Otherwise, process 700 proceeds to step 710, in which the master device waits to receive an OK status from the slave device. When the OK status is received from the slave device, indicating that the link has been established, clock modulation can begin.

As noted above, embodiments are especially useful in communication systems using echo cancellation. This is because systems that use echo cancellation (e.g., gigabit Ethernet) require tight timing tolerance between link partners. Echo cancellation is a well-known method whereby the local and remote devices transmit simultaneously on the same pair in the same frequency band. This allows full-duplex transmission over one pair, increasing bandwidth efficiency of the system. In an echo-cancelled system, there will be interference, or cross-talk, from the local transmitter onto the received signal from the remote device. The transmitted signal is subtracted from the received signal via an adaptive filter using digital or analog means, increasing the ratio of the received signal to the transmitted interference.

When spread spectrum modulation is applied to an echo-cancelled system, propagation delay of the link becomes important. Thus, according to embodiments, the algorithm implementing clock adjustment on the slave side is made aware of the cable length when setting its own clock and the clock is set by accounting for propagation delay. In this way frequency offset between the master device and the slave device is minimized as much as possible. The propagation delay may be determined using TDR or equivalent techniques, or if the cable length is fixed the propagation delay or the cable length can be maintained in memory. The propagation delay can be determined from the cable length using known relationships based on the cable type. For example, with Cat-5e cable, the propagation delay is specified at 570 ns per 100 m.

Figure 8:
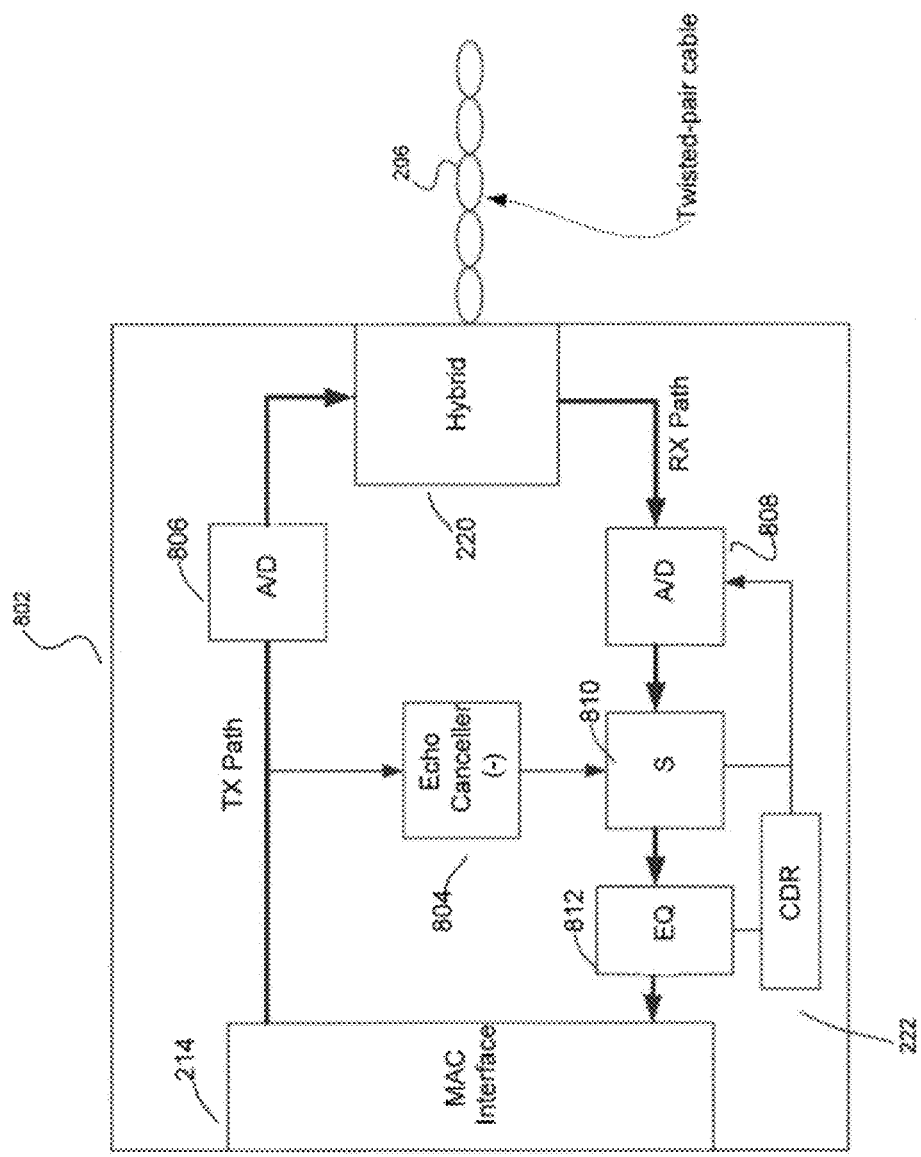
FIG. 8 illustrates an example system using echo cancellation.

FIG. 8 illustrates an example gigabit Ethernet communication system 800 with echo cancellation. Example system 800 includes a transceiver module 802 connected to a twisted pair cable 206. As shown in FIG. 8, transceiver module 802 includes (in addition to other components described above with reference to FIG. 2) an echo canceller 804, a D/A converter 806, an A/D converter 808, a summer 810, and an equalizer 812.

In gigabit Ethernet, devices transmit and receive on the same baseband frequency range simultaneously (full duplex) over four twisted pairs. As such, the transmitted signal combines with the received signal in hybrid coupler 220 and is reflected as an echo in the signal received from hybrid coupler 220. Typically, the transmitted signal is much larger in amplitude than the received signal. However, since the transmitted signal is known, its echo can be subtracted out from the signal received from hybrid coupler 220 to recover the received signal only. This can be done, as shown in FIG. 8, for example. Echo canceller 804 receives as input the transmitted signal and generates a scaled version thereof. Summer 810 receives as inputs the signal received from hybrid coupler 220 (after A/D conversion by A/D converter 808) and the scaled version of the transmitted signal, and subtracts the latter signal from the former. The resulting signal is equalized using equalizer 812.

A key requirement for echo cancellation, however, is that the transmitted signal and the received signal are phase-aligned in order for summer 810 to subtract in-phase the scaled version of the transmitted signal from the signal received from hybrid coupler 220. As such, low timing uncertainty between the transmitted signal and the received signal as well as compensation for cable propagation delay are required. For this reason, systems using echo cancellation can benefit greatly from the embodiments described above. Particularly, embodiments allow systems using echo cancellation to continue to work properly in environments where the modulated clock appears as jitter to a non-modulated clock domain, such as, for example, in communication networks using spread spectrum modulated clocks.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A system, comprising:
a clock and data recovery (CDR) circuit configured to receive a data stream having embedded therein a spread spectrum (SS) modulated clock signal and to generate a recovered clock signal from the data stream;
a phase tracking circuit, coupled to the CDR circuit, configured to determine a phase offset between the recovered clock signal and a local clock signal;
a controller configured to read the determined phase offset and to generate a control signal based on the determined phase offset; and
an oscillator configured to adjust the local clock signal based on the control signal, thereby reducing the phase offset between the recovered clock signal and the local clock signal.

2. The system of claim 1, wherein the SS modulated clock signal is frequency modulated.

3. The system of claim 1, wherein the controller is further configured to implement a proportional-integral-derivative (PID) controller algorithm.

4. The system of claim 3, wherein the controller is further configured to set the determined phase offset as an error signal in the PID controller algorithm.

5. The system of claim 4, wherein the control signal corresponds to an output signal of the PID controller algorithm.

6. The system of claim 1, wherein the control signal provides a setpoint value for the oscillator.

7. The system of claim 1, further comprising:
a phase offset register, wherein the phase tracking circuit is further configured to store the determined phase offset in the phase offset register.

8. The system of claim 7, wherein the controller is farther configured to sample periodically the phase offset register to read the determined phase offset.

9. The system of claim 8, wherein the controller is further configured to sample the phase offset register according to an expected rate of change of the determined phase offset.

10. The system of claim 1, further comprising:
a digital phase locked loop (PLL) configured to generate a predicted phase value of the recovered clock signal; and
a control circuit configured to generate a predicted phase offset based on the predicted phase value and the local clock signal and to control the oscillator based on the predicted phase offset.

11. The system of claim 10, wherein the digital PLL is further configured to generate the predicted phase value of the recovered clock signal based on known modulation characteristics of the SS modulated clock signal.

12. The system of claim 10, wherein the controller is further configured to correct periodically the predicted phase offset upon reading the determined phase offset.

13. The system of claim 10, further comprising:
a low pass filter configured to filter a phase signal of the recovered clock signal and to provide a filtered phase signal of the recovered clock signal to the digital PLL.

14. The system of claim 1, wherein the oscillator is one of a numerically controlled oscillator (NCO) and a voltage controlled oscillator (VCO).

15. The system of claim 1, further comprising:
an echo canceller configured to use the recovered clock signal and the local clock signal to reduce an echo due to a stream transmitted by the system in the received data stream.

16. A method, comprising:
sending a status signal regarding operability with spread spectrum (SS) clock modulation;
receiving a data stream having embedded therein a SS modulated clock signal responsive to the status signal;
generating a recovered clock signal from the data stream;
calculating a phase offset between the recovered clock signal and a local clock signal; and
adjusting the local clock signal according to the calculated phase offset to reduce a phase shift between the recovered clock signal and the local clock signal.

17. The method of claim 16, wherein said adjusting step further comprises:
generating a control signal based on the calculated phase offset; and
adjusting the local clock signal using the control signal.

18. The method of claim 16, further comprising:
receiving a control signal regarding operability with SS clock modulation;
sending the status signal in response to said control signal.

19. The method of claim 16, further comprising prior to said receiving step:
receiving information regarding modulation characteristics of said SS modulated clock signal.

20. The method of claim 19, further comprising:
generating a predict phase offset based on said received information regarding modulation characteristics; and
adjusting the local clock signal based on the predicted phase offset in between periodical adjustments of the local clock signal based on the calculated phase offset.

21. The method of claim 19, further comprising:
generating a predicted phase offset based on scrambler information regarding modulation characteristics; and
adjusting the local clock signal based on the predicted phase offset.

* * * * *

UNITED STATES PATENT AND TRADEMARK OFFICE
CERTIFICATE OF CORRECTION

PATENT NO. : 8,582,710 B2  Page 1 of 1
APPLICATION NO. : 13/077506
DATED : November 12, 2013
INVENTOR(S) : Pischl et al.

It is certified that error appears in the above-identified patent and that said Letters Patent is hereby corrected as shown below:

In the Claims:

In column 9, line 40, "farther" should be replace with --further--.

Signed and Sealed this
Fourth Day of March, 2014

Michelle K. Lee
*Deputy Director of the United States Patent and Trademark Office*